United States Patent [19]

Price et al.

[11] Patent Number: 4,826,045

[45] Date of Patent: May 2, 1989

[54] FLUID STORAGE AND EXPULSION SYSTEM

[75] Inventors: Joseph Price, Fairlawn; Martin Scheinberg, Clifton, both of N.J.

[73] Assignee: Arde, Inc., Norwood, N.J.

[21] Appl. No.: 905,839

[22] Filed: Sep. 10, 1986

[51] Int. Cl.[4] ........................ B65D 35/28; B65D 6/12; B67D 5/42; F16L 55/04

[52] U.S. Cl. ...................................... 222/95; 222/105; 222/386.5; 222/389; 220/85 B; 138/30

[58] Field of Search ................ 222/94, 95, 105, 386.5, 222/389, 206, 211, 394; 220/85 B; 138/30, 31, 26

[56] References Cited

U.S. PATENT DOCUMENTS 3,123,248 3/1964 Koch ................................ 220/85 B
3,592,360 7/1971 Aleck .................................. 222/95
3,880,325 4/1975 Rabe .................................... 222/95
4,060,175 11/1977 Rysgaard, Sr. .................. 220/85 B

FOREIGN PATENT DOCUMENTS 946668 1/1964 United Kingdom ................. 138/30

*Primary Examiner*—Joseph J. Rolla
*Assistant Examiner*—Gregory L. Huson
*Attorney, Agent, or Firm*—Cohen, Pontani & Lieberman

[57] ABSTRACT

An improved diaphragm-type fluid storage amd expulsion system includes a rigid elongated guide member secured to the polar region of an expulsion diaphragm and journalled for axially sliding movement through a sleeve located in the corresponding polar region of a tank. The guide member provides support for the diaphragm protecting it from lateral forces.

8 Claims, 3 Drawing Sheets

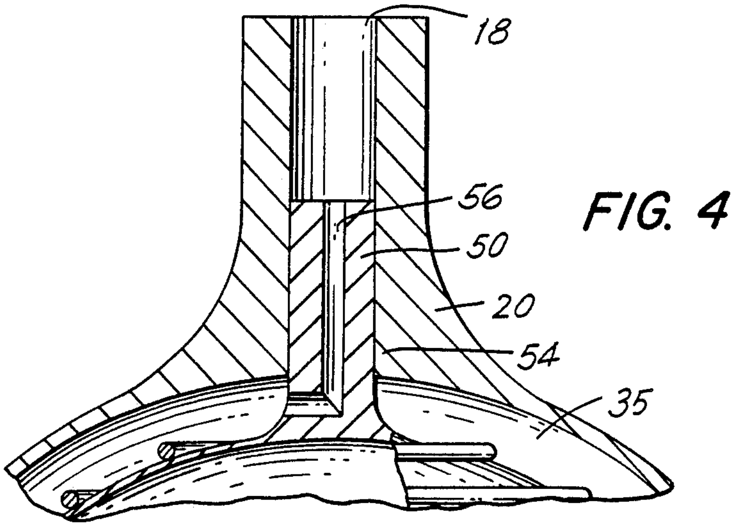
FIG. 4
FIG. 5
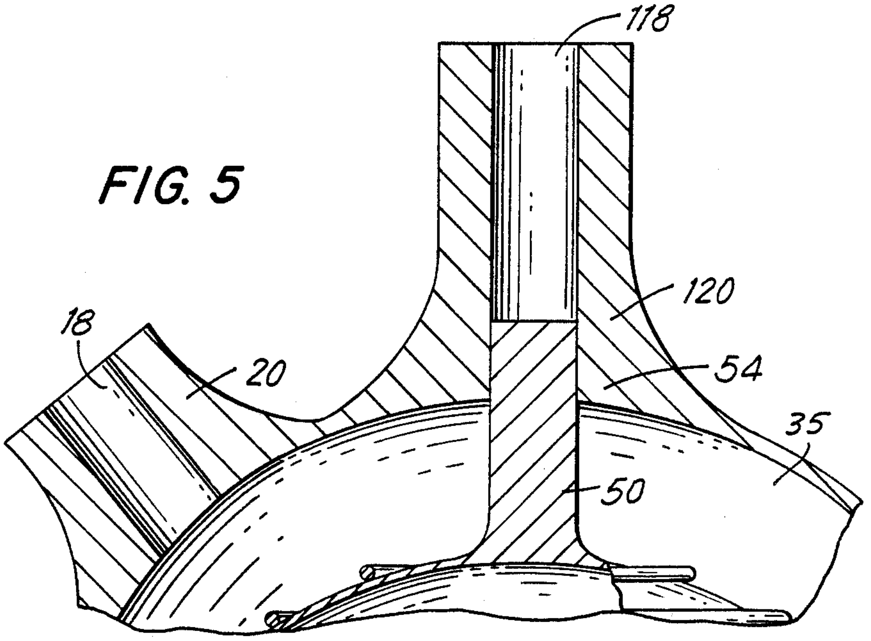
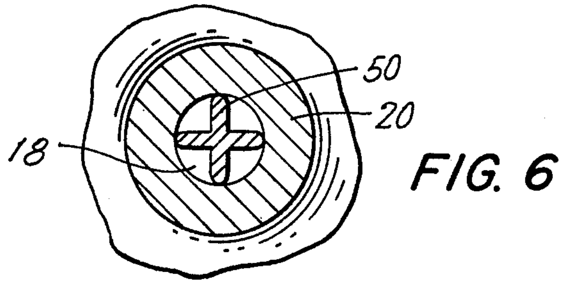
FIG. 6

FLUID STORAGE AND EXPULSION SYSTEM

FIELD OF THE INVENTION

This invention is related to the field of fluid storage and expulsion devices wherein the fluid is expelled out of a tank by a positive expulsion mechanism. More particularly, this invention relates to a fluid expulsion device wherein a reversible bladder or diaphragm is utilized, the diaphragm containing the fluid is subjected to external pressure, the pressure forcing the diaphragm to expel the fluid out of the tank.

DESCRIPTION OF THE PRIOR ART

Diaphragm-type fluid storage and expulsion devices are known in the prior art and have particular application in the aerospace industry, e.g. for storing and expelling fluid carried in a space vehicle. Examples of known devices are disclosed in U.S. Pat. Nos. 4,216,881; 3,592,360; and 3,339,803; and each of these U.S. patents is incorporated herein by reference.

Known fluid storage and expulsion devices generally include a tank of spherical, prolate spheroidal, or oblate spheroidal shape or a cylindrical tank with hemispheric ends. These tanks can be described generally as being symmetrical about a diametral plane or equator. A diaphragm is disposed within the tank on one side of the diametral plane of the tank. The diaphragm is shaped to conform to the shape of and cover the inner surface of the tank on one side of the equator and is fixed to the inner surface of the tank at or near the equator. Fluid is stored in the chamber defined by the diaphragm and the uncovered portion of the tank. The tank is provided with a fluid port located in the uncovered portion of the tank and a pressure port located in the covered portion of the tank. When pressurant is applied to the diaphragm through the pressure port, the diaphragm commences to collapse and move toward the fluid port to thereby force the fluid out of the chamber and through the fluid port.

A number of difficulties have been encountered with these devices. The major difficulty has been failure of the diaphragm because of buckling or canting. Buckling or canting of the diaphragm may occur during the collapsing movement of the diaphragm if such collapsing movement is disorganized. Various designs have been applied to encourage an organized collapse of the diaphragm to prevent buckling or canting during collapse. Notable among these designs is the diaphragm configuration disclosed in U.S. Pat. No. 3,339,803 to Wayne et al which shows the use of stabilizing stiffener rings which are applied to the surface of the diaphragm. These stabilizing rings are effective in preventing buckling or canting of the diaphragm caused by a disorganized collapsing movement of the diaphragm during normal fluid expulsion.

As a matter of design choice, the diaphragm and tank can be arranged so that the diaphragm begins its collapse at the polar region and thereby rolls in on itself about latitudinally extending circles as shown in the aforementioned Wayne et al patent. Alternatively, it is sometimes arranged that the diaphragm commences its collapse first at the equatorial region. In this case, where the diaphragm begins its collapse at the equatorial region, buckling of the diaphragm can occur due to forces other than those which are applied in normal use to effect the collapsing movement of the diaphragm. In order to appreciate how this can happen, it should be noted that often the diaphragm is only partially collapsed to produce a partial expulsion of fluid, the remaining fluid remaining within the space defined by the tank and the partially collapsed diaphragm to be expelled later as needed. When the diaphragm is partially collapsed a the equator, buckling of the diaphragm can occur as a result of lateral movement or canting of the diaphragm in response to lateral forces. For example, the inertial movement of the stored fluid in response to an acceleration of a space vehicle carrying the device can produce such forces on the diaphragm. These forces exerted on the diaphragm by the fluid can cause the diaphragm to shift laterally, buckle, and possibly puncture. This results in serious damage to the diaphragm and failure of the expulsion system. Even if such diaphragm damage does not occur, such lateral movement or canting of the diaphragm can result in undesired and uncontrolled expulsion of fluid. Both of these problems can produce hazardous conditions.

Known prior art improvements in the design of diaphragm-type fluid storage and expulsion systems have only addressed the problem of diaphragm buckling or canting caused by disorganized collapsing movement of the diaphragm in the polar direction during fluid expulsion. None of the known prior art has addressed the problem of protecting the diaphragm from lateral vibrations and accelerations which result from forces other than the collapsing movement of the diaphragm during fluid expulsion.

SUMMARY OF THE INVENTION

The improved fluid storage and expulsion system of the present invention comprises a tank, preferably of approximately prolate spheroidal (football) shape having a pressure port at or near one pole and a fluid port at or near the other pole, although the invention applies to other substantially symmetrical tanks like a sphere, a cylinder with hemispherical ends, etc. The tank is preferably formed in two halves and structurally joined at the equator to form a leak-tight assembly. A reversible diaphragm, preferably designed for orderly polar collapse, such as, for instance, by ring stabilization, lines substantially one half of the interior of the tank and is joined to the interior of the tank at a parallel close to the equator. The polar region of the diaphragm is provided with a stabilizing pin. This stabilizing pin comprises a rigid elongated guide member which is secured at one end to the polar region of the diaphragm, and is journalled for axially slidable movement through a sleeve located in the corresponding polar region of the tank.

The pin supported diaphragm of the present invention provides several advantages over the prior art in that the diaphragm is stabilized against high lateral forces. The addition of the stabilizing pin to the fluid expulsion system results in additional advantages in that the stabilizing rings of the diaphragm, if stabilizing rings are used, may be made smaller and lighter, the pressure required for actuation of the collapsing movement of the diaphragm in the polar direction is lower, and the altitude to diameter ratio of the diaphragm may be increased to improve the spatial utilization of the fluid storage and expulsion system.

BRIEF DESCRIPTION OF THE DRAWINGS

FIG. 4 is a fragmentary sectional view of a modified embodiment of the present invention;

FIG. 5 is a fragmentary sectional view similar to FIG. 4 of another embodiment of the present invention;

FIG. 6 is a top plan view of yet another embodiment of the present invention.

DETAILED DESCRIPTION OF THE PREFERRED EMBODIMENTS

Figure 2:
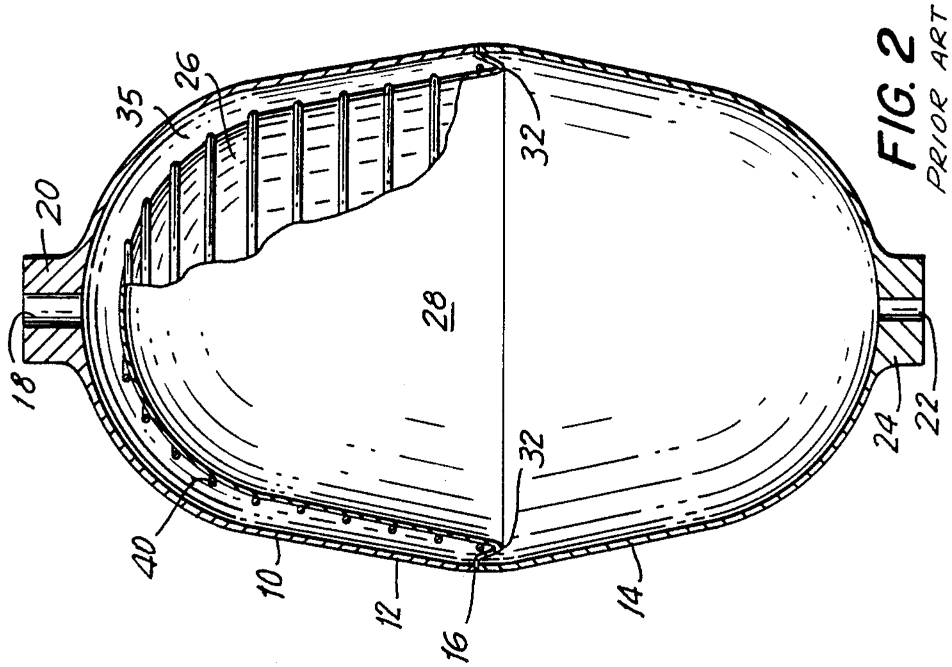
FIG. 2 PRIOR ART
FIG. 2 is a view similar to FIG. 1 showing the diaphragm in a state of partial collapse.
Figure 1:
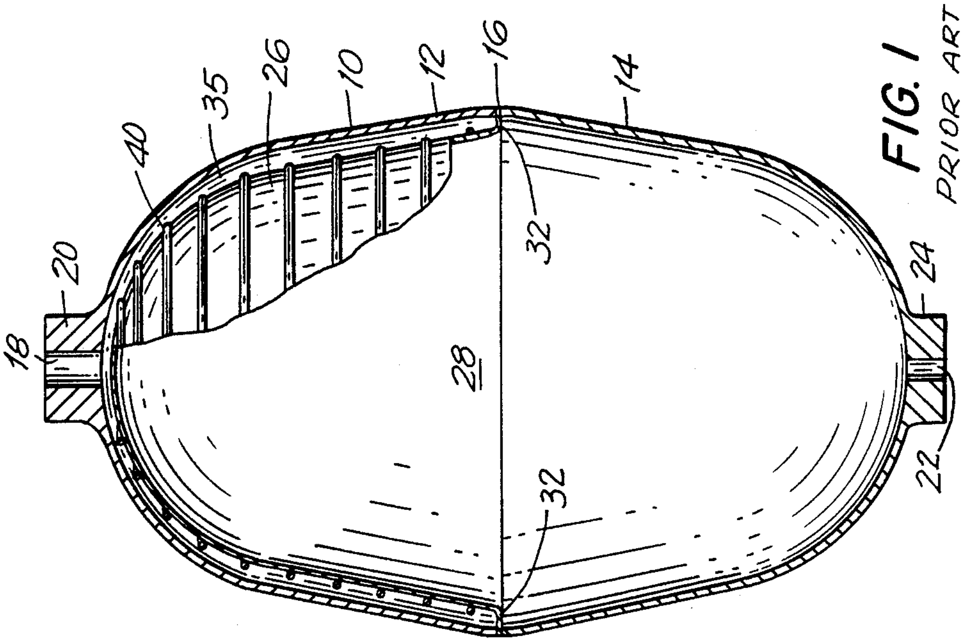
FIG. 1 PRIOR ART
FIG. 1 is a view partly in section and partly in elevation of a known ring stabilized diaphragm-type fluid storage and expulsion system, shown in its initial position.

FIGS. 1 and 2 illustrate a prior art device of the type described in said aforementioned Wayne and Aleck patent. They are included to explain the problem solved by the present invention; they themselves do not illustrate any part of the present invention.

Referring now to FIG. 1 in detail, a diaphragm-type fluid storage and expulsion device is shown comprising a tank 10 which is symmetrical about a diametral plane. Tank 10 is made of an upper portion 12 and a lower portion 14 structurally joined at an equator 16 as by welding. The tank may be formed of any suitable material depending on its intended use, and in many aerospace applications high strength material such as Series 300 Stainless Steel, maraging steels, or cryogenically stretch formed steels are desirable for the formation of tank 10, although numerous other materials may be used in such applications.

Tank 10 is shown to be of modified prolate spheroidal shape, i.e. it is modified so that portions on either side of the diametral plane are frustoconical while the polar regions remain spherical in shape. This is a preferred shape, although not necessary to this invention.

A reversible diaphragm 26 conforms essentially to the interior surface of the upper portion 12 of tank 10. Diaphragm 26 is secured by its lower edge 32 to the interior of tank 10 at or near the equator 16. The diaphragm is preferably made of highly yieldable metal such as austenitic stainless steel or the like, but may be made of any suitable material. The upper portion 12 of tank 10 is provided with a pressure port 18 through which a pressurant, often a compressed gas, may enter to reside in a pressurant region 35 and therein act against diaphragm 26. This pressurant region 35 is the space defined by the interior surface of the upper portion 12 of tank 10 and the upper surface of diaphragm 26. The lower portion 14 of tank 10 is provided with a fluid port 22 through which fluid may enter or exit a fluid region 28. This fluid region 28 is the space defined by the inner surface of the lower portion 14 of tank 10 and the lower surface of diaphragm 26.

Pressure port 18 and fluid port 22 are advantageously placed concentric to the polar axis of tank 10, and located respectively within pressure port boss 20 and fluid port boss 24. However, as will be discussed in further detail below, the pressure port and fluid port can be located off the polar axis if desired.

Diaphragm 26 is provided with means for preventing disorderly collapse during expulsion, here shown and presently preferred to be stabilizing rings 40, although other known means may be employed in lieu thereof or in addition thereto. The use of such stabilizing rings is described and claimed in U.S. Pat. No. 3,339,803 to Wayne et al. for Fluid Storage and Expulsion System, which patent is assigned to the assignee hereof. A detailed description of the stabilizing rings is therefore deemed unnecessary as reference may be had to the aforementioned patent to Wayne et al. However, it should be realized that other means may be employed to promote the orderly collapse of the diaphragm, and the use of stabilizing rings is not necessary to obtain the benefits of the present invention.

As is well known to those skilled in the art of fluid storage and expulsion systems of this type, the collapse of diaphragm 26 is accomplished by introducing a pressurant into the pressurant region 35 through the pressure port 18. This collapse of diaphragm 26 results in the fluid stored in the fluid region 28 being expelled through fluid port 22. The tank 10 and diaphragm 26 shown in FIG. 1 and designed so that the diaphragm will begin its collapse at its lower edge 32 rather than beginning its collapse from the polar region as shown in said Wayne et al patent.

As can be seen in FIG. 2, if the diaphragm is designed to collapse first at or near the equator, the uncollapsed portion of the diaphragm moves away from the tank as soon as partial collapse in the equatorial region occurs. When the diaphragm is close to the tank, before collapse as shown in FIG. 1, the tank supports the diaphragm against lateral movement. However, as shown in FIG. 2, when the diaphragm is partially collapsed, the tank can no longer support the uncollapsed portion of the diaphragm against lateral movement since that portion of the diaphragm has moved away from the surface of the tank. The uncollapsed portion of the diaphragm is left unsupported and free to move laterally in response to lateral forces thereon, which lateral movement can result in damage to the diaphragm and/or uncontrolled expulsion of fluid. The present invention is directed towards providing means by which diaphragm 26 will resist lateral movement, damage, and uncontrolled expulsion of fluid resulting from severe lateral forces when in the partially collapsed condition.

Figure 3:
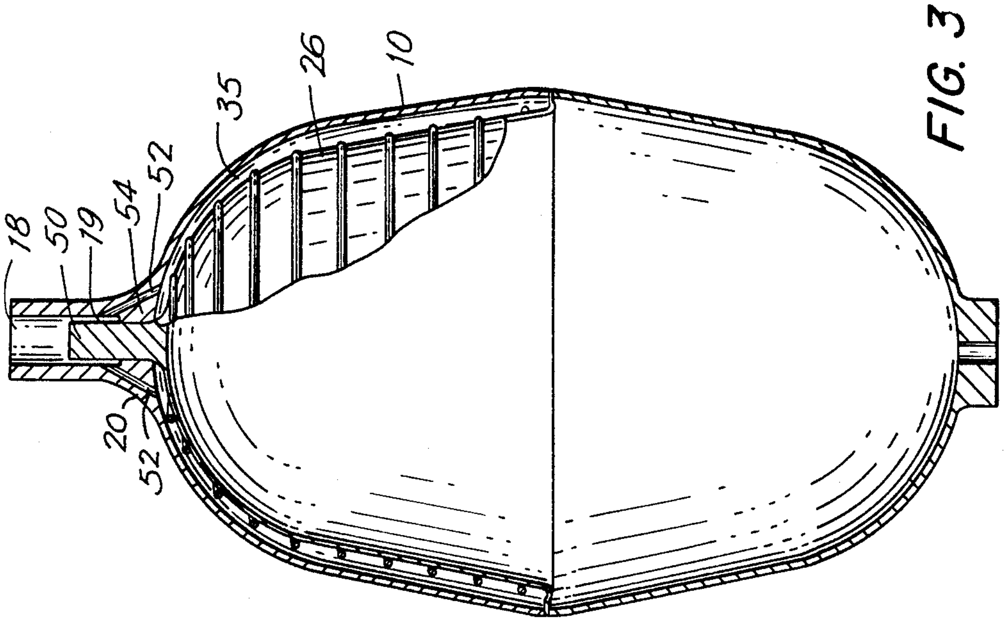
FIG. 3 is a view partly in section and partly in elevation showing one embodiment of the present invention with the diaphragm in its initial or uncollapsed position.

Referring to FIG. 3, the present invention includes the provision of an elongated guide member in the form of an axial stabilizing pin 50 connected to diaphragm 26 in the polar region. Pin 50 is preferably made of a similar material as diaphragm 26 and may be affixed to diaphragm 26 by brazing, although any suitable material may be used to form pin 50 and any suitable means to attach it to diaphragm 26 ma be used. Pin 50 is located at the polar axis of diaphragm 26 and thereby extends into a sleeve 54 located in the corresponding polar region of tank 10. If desired, sleeve 54 may be the pressure port 18 such that pin 50 may slide into or out of port 18 through sleeve 54, (see for example FIGS. 4 and 6 described below.) In the embodiment shown in FIG. 3, pressure port boss 20 is provided with one or more passages 52 which extend from a step to pressurant region 35 to allow pressurant to enter into the pressurant region unimpeded by pin 50, to act against diaphragm 26. Passages 52 may be arranged in a number of different ways which will be apparent to those skilled in the art. As shown in FIG. 3, the interior of boss 20 is stepped with the smaller diameter portion adjacent pressurant region 35. Pin 50 is of the same diameter as the smaller diameter portion of the interior. Thus, an annular space 19 is created between the outer surface of pin 50 and the inner surface of boss 20. Passages 52 connect this annular space 19 with pressurant region 35.

Figure 7:
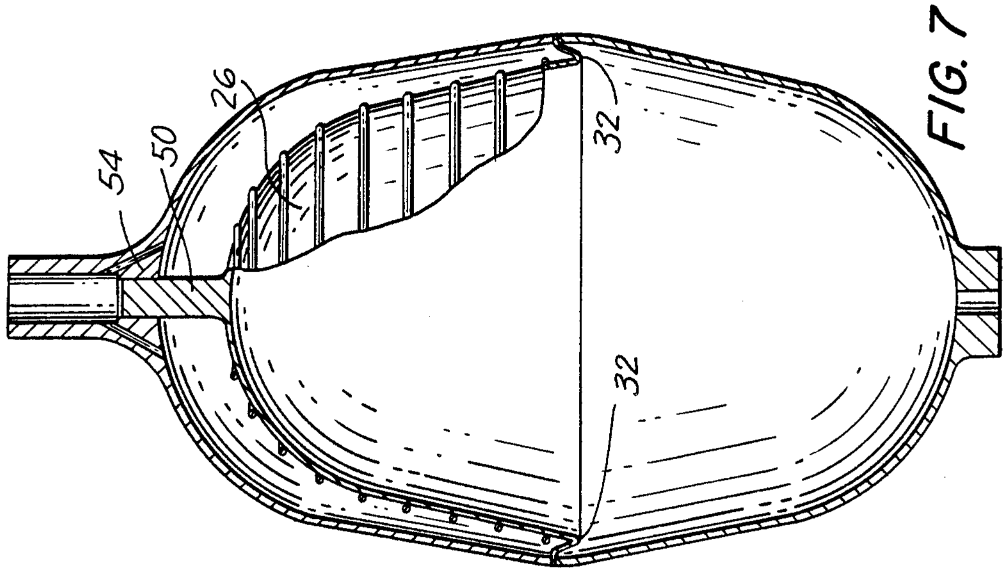
FIG. 7 is a view similar to FIG. 3 showing the diaphragm in a state of partial collapse.

Referring now to FIG. 7, the diaphragm 26 is shown as partially collapsed, having expelled fluid and pin 50 is shown still securely within sleeve 54 to support the diaphragm and protect it against lateral movement. It can be seen how the stabilizing pin 50 of the present invention will stabilize the diaphragm 26 against lateral forces by preventing buckling or canting of the diaphragm in the lateral direction. As was previously discussed in connection with prior art FIGS. 1 and 2, without pin 50, diaphragm 26 is cantilever supported only at its lower edge 32. This cantilever support leaves the diaphragm vulnerable to lateral forces, particularly at the polar region, the part of the diaphragm which is farthest from its support. Stabilizing pin 50 protects the diaphragm 26 from lateral movement by providing additional support in the polar region of diaphragm, i.e. in the region where support is most lacking. At some point during the collapse of diaphragm 26, the length of pin 50 may permit it to leave sleeve 54. This is permissible since, at a certain point during the collapse of diaphragm 26, the mass of fluid contained by diaphragm 26 will be so reduced that lateral movement of said fluid will no longer exert enough force to result in buckling or canting of the diaphragm. Moreover, it is possible to calculate at what point during the collapse of diaphragm 26, the pin 50 is no longer required to stabilize the diaphragm against lateral movement With this information, the person of ordinary skill can adjust the length of pin 50 accordingly.

FIG. 4 shows an alternative embodiment of the present invention wherein stabilizing pin 50 is provided with a passage 56 which performs the same function as passage 54 in boss 20 shown in FIG. 3, that is to allow pressurant to enter from pressure port 18 into pressurant region 35 without interference from pin 50. Passage 56 is shown as axial to pin 50 in one portion where pressurant enters from port 18, but bends to a radial direction in the portion of the passage where pressurant exits into pressurant region 35. It is apparent that other passage arrangements within pin 50 will accomplish the same result as the arrangement shown by example in FIG. 4. For example, the pin configuration shown in FIG. 6 is star-shaped in cross-section and thus provides four passages arranged as longitudinal grooves between the surface of pin 50 and the inner surface of pressure port boss 20. It should be noted that in these embodiments (FIGS. 4 and 6) where passages are provided in pin 50, the interior of boss 20 need not be stepped as shown in FIGS. 3 and 7 since pressurant may enter the passage or passages at the top of pin 50 and there is no need to provide an annular space for pressurant to flow around pin 50 to reach passages 52.

FIG. 5 shows yet another alternative arrangement wherein pressure port 18 is located off the polar axis of tank 10. In this case sleeve 54 is preferably located in a pin port 118 through which pin 50 may slide in an axial direction. When this type of arrangement is used, either pin port 118 or sleeve 54 must be pressure sealed to prevent the escape of pressurant from pressurant region 35 through pin port 118. Since pressurant is not entering the pressurant region through this port, the interior of pin port boss 120 need not be stepped and no passages are needed either in the boss or the pin.

If the present invention is employed with a ring stabilized diaphragm as shown in U.S. Pat. No. 3,339,803 to Wayne et al, further advantages are realized. These advantages include the ability to use smaller and lighter stabilizing rings since the stabilizing pin 50, in addition to providing protection of the diaphragm against lateral movement, also provides additional support against disorganized collapse of the diaphragm 26. In addition, because the stabilizing pin 50 is located in the polar region of the diaphragm 26, the pressure required to actuate collapse of the diaphragm is lower since the presence of the pin forces the pressurant away from the polar region to act on the diaphragm in regions where lower pressure is required to cause collapse. It is also possible to increase the ratio of altitude to diameter of the tank because of the lower actuation pressure. Such an increase in altitude to diameter ratios normally results in an increase in the required actuation pressure. Since the actuation pressure is now lower by virtue of the present invention, this ratio can be increased as an alternative to operating with a lower actuation pressure.

While I have herein shown and described the preferred embodiment of the invention and various modifications thereof, persons of ordinary skill in the art will recognize that other changes and modifications may be made therein without departing from the spirit and scope of the invention. Accordingly, the above description should be construed as illustrative, and not in a limiting sense, the scope of the invention being defined by the following claims.

We claim:

1. An improved fluid storage-expulsion system of the type having a tank which is substantially symmetrical about a diametral plane, said tank having a polar axis perpendicular to said plane and two polar regions; and a collapsible expulsion diaphragm, said diaphragm being located on one side of said plane conforming substantially to the interior surface of the portion of said tank on said one side of said plane, said diaphragm and said interior surface defining therebetween a pressurant region, said tank having a pressure port for the application of pressurant into said pressurant region to effect the collapse of said diaphragm, said pressure port being located on said one side of said plane, said tank further having a fluid port on the other side of said plane for the expulsion of fluid during the collapse of said diaphragm, the improvement comprising:

a rigid elongated guide member, said guide member being secured at one end to a polar region of said diaphragm on said one side of said plane and extending along said polar axis away from said plane a distance not greater than that between said tank polar region and said plane, and a guide member sleeve mounted on said tank, said sleeve being located concentric to said polar axis of said tank on said one side of said plane, said guide member being movable with said polar region of said diaphragm on said one side of said plane and being slidably disposed in said sleeve for at least an initial axial sliding movement through said sleeve when said collapsible diaphragm moves away from initial conformance with the interior surface of said tank on said one side of said plane.

2. An improved fluid storage and expulsion system as claimed in claim 1, further comprising a plurality of reinforcement rings on said diaphragm.

3. An improved fluid storage and expulsion system as claimed in claim 1, wherein said tank is of modified prolate spheroidal shape, the portion of said tank adjacent to the diametral plane being substantially frustoconical.

4. An improved fluid storage and expulsion system as claimed in claim 1, wherein said sleeve is said pressure port.

5. An improved fluid storage and expulsion system as claimed in claim 4, wherein said pressure port is located within a boss and said boss is provided with a passage for conducting pressurant from said pressure port into said pressurant region.

6. An improved fluid storage and expulsion system as claimed in claim 4, wherein said guide member is provided with a passage therethrough for conducting pressurant from said pressure port into said pressurant region.

7. An improved fluid storage and expulsion system as claimed in claim 6, wherein said passage has first and second portions, said first portion extending axially through said guide member, which first portion is adjacent to the end of said guide member which faces said pressure port, the second portion of said passage communicating with said first portion and extending radially through said guide member, said second portion being adjacent to the end of said guide member which faces said diaphragm.

8. An improved fluid storage and expulsion system as claimed in claim 6, wherein said passage is an axial groove in the surface of said guide member.

* * * * *